United States Patent [19]

Wiggins et al.

[11] 4,057,667
[45] * Nov. 8, 1977

[54] ORIENTED SARAN COEXTRUDATE

[75] Inventors: Glenn C. Wiggins, Midland; Marvin J. Kreh, Essexville; Robert S. Davis, Midland, all of Mich.

[73] Assignee: American Can Company, Greenwich, Conn.

[*] Notice: The portion of the term of this patent subsequent to Dec. 26, 1989, has been disclaimed.

[21] Appl. No.: 602,535

[22] Filed: Aug. 6, 1975

Related U.S. Application Data

[60] Division of Ser. No. 237,953, March 24, 1972, Pat. No. 3,924,051, which is a continuation of Ser. No. 70,524, Sept. 8, 1970, abandoned, which is a continuation of Ser. No. 630,889, April 14, 1967, abandoned.

[51] Int. Cl.² .................... B65D 1/00; A21D 10/02; B32B 15/08; B32B 27/08
[52] U.S. Cl. .................... 428/35; 428/458; 428/463; 428/512; 428/513; 428/514; 428/518; 428/520; 428/522; 229/3.5 R; 426/126; 426/127; 426/130; 426/415
[58] Field of Search ............ 428/509, 510, 512, 513, 428/514, 518, 520, 521, 522, 35, 458, 463; 229/3.5 R; 426/126, 127, 130, 415

[56] References Cited

U.S. PATENT DOCUMENTS

| | | | |
|---|---|---|---|
| 3,387,640 | 6/1968 | Butler | 229/86 |
| 3,445,324 | 5/1969 | Curler et al. | 428/334 |
| 3,524,795 | 8/1970 | Peterson | 428/518 |
| 3,536,501 | 10/1970 | Work | 426/130 |
| 3,616,191 | 10/1971 | Fuerholzer et al. | 456/244 |
| 3,637,103 | 1/1972 | Ptak | 428/518 |
| 3,647,485 | 3/1972 | Seiferth et al. | 426/127 |
| 3,682,767 | 8/1972 | Britton et al. | 428/520 |
| 3,707,590 | 12/1972 | Wiggins et al. | 264/95 |
| 3,741,253 | 6/1973 | Brax et al. | 428/520 |
| 3,793,135 | 2/1974 | Monia | 428/35 |
| 3,851,068 | 11/1974 | Kraft | 426/130 |
| 3,924,051 | 12/1975 | Wiggins et al. | 428/518 |

Primary Examiner—William R. Dixon, Jr.
Attorney, Agent, or Firm—Robert P. Auber; Ira S. Dorman; George P. Ziehmer

[57] ABSTRACT

An oriented two-layered laminate of vinylidene chloride-vinyl chloride copolymer as one layer and an ethylene-unsaturated ester type copolymer as the other layer. To this laminate may be adhered another polymer, also capable of being oriented, plastic sheet, paper sheet or board, metal or metal foil. Products such as pouches, chubs, formed troughs and the like can be made therefrom because the vinylidene chloride-vinyl chloride copolymer retains its orientation.

9 Claims, 11 Drawing Figures

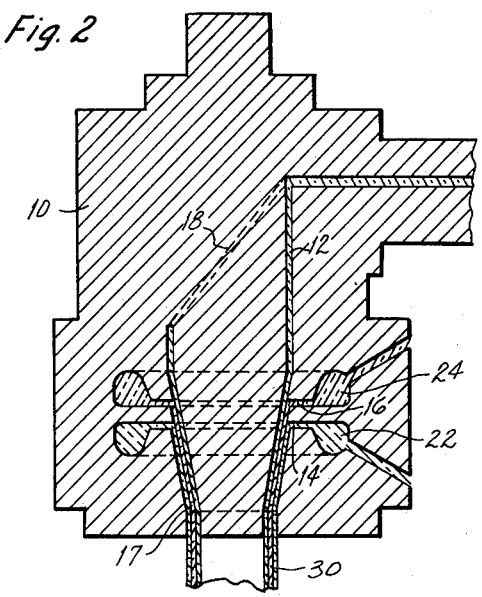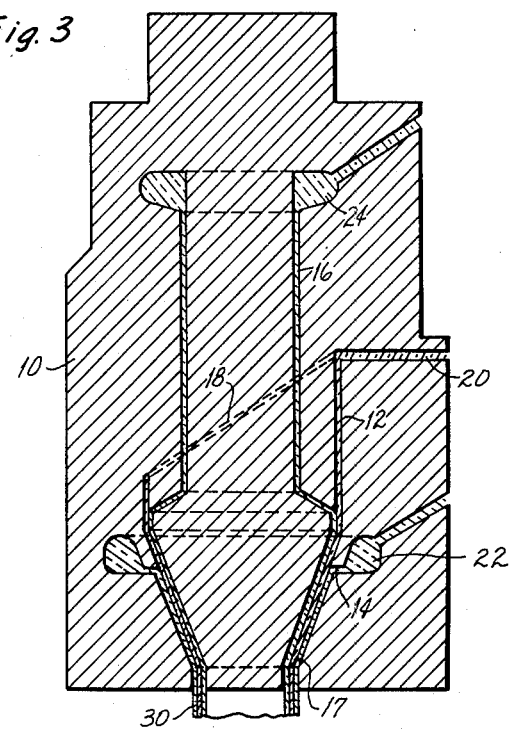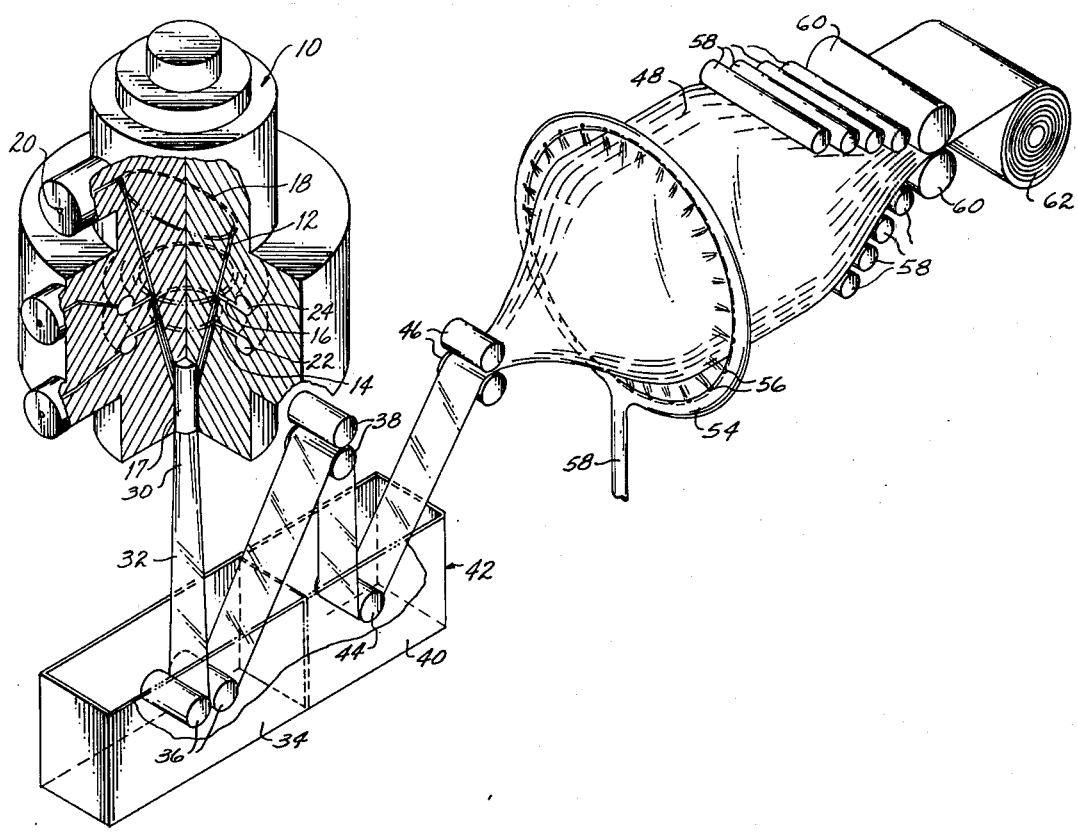

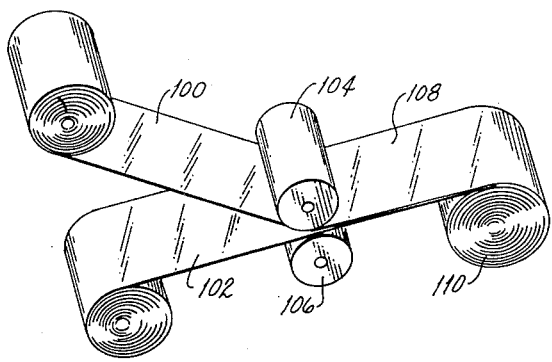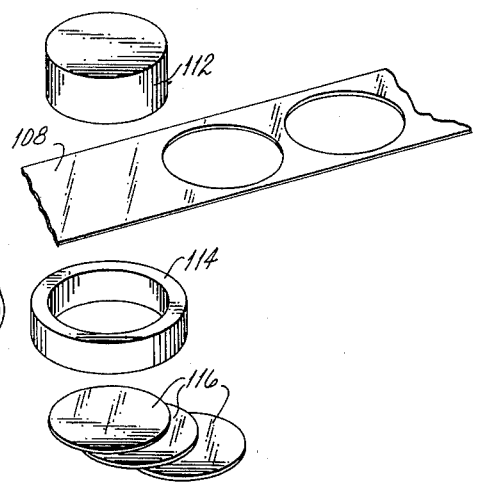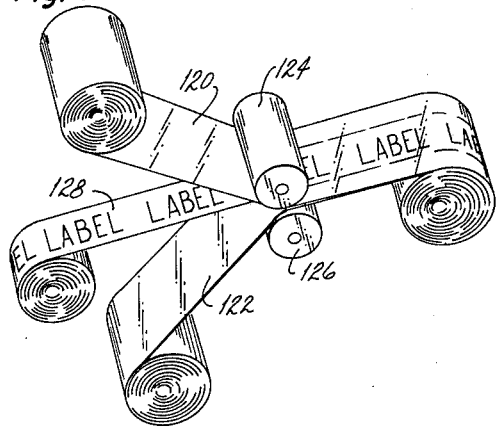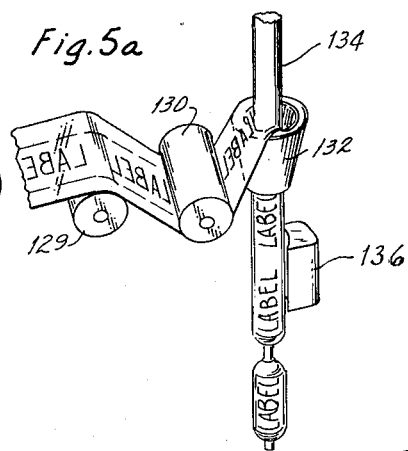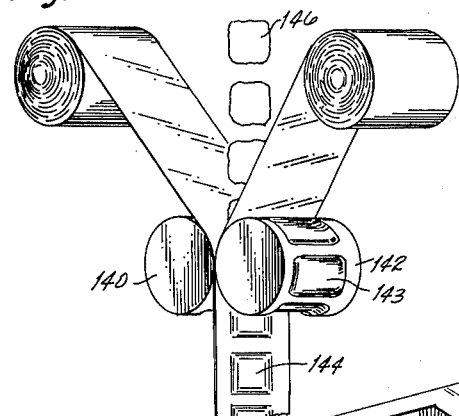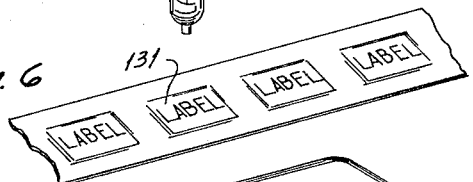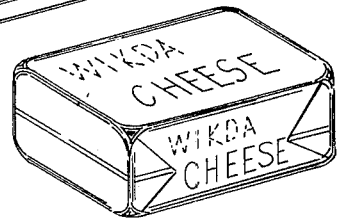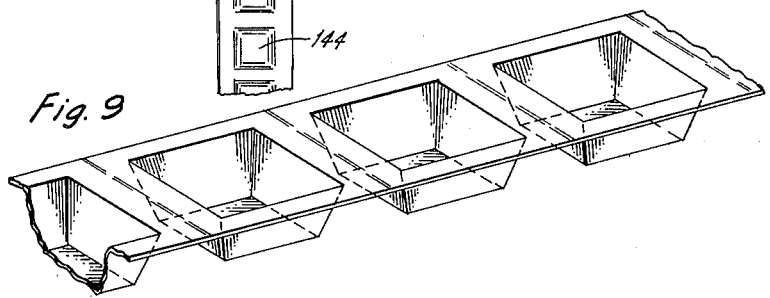

ORIENTED SARAN COEXTRUDATE

This is a division of application Ser. No. 237,953, filed Mar. 24, 1972, now U.S. Pat. No. 3,924,051, which in turn was a continuation of Ser. No. 70,524, filed Sept. 8, 1970, now abandoned which in further turn was a continuation of Ser. No. 630,889, filed Apr. 14, 1967 now abandoned.

This invention relates to a unique oriented basic laminate of a vinylidene chloride-vinyl chloride copolymer and an ethylene-unsaturated ester type copolymer. The basic laminate may have adhered thereto another polymer, or a paper or metal product such as paper sheet or board, foil and the like. This invention also relates to the method and the apparatus for preparing the laminate, for adhering another polymer, or a paper or metal product thereto and the articles produced therefrom.

The use of films of vinylidene chloride-vinyl chloride copolymer, more commonly known as "saran", has become extremely popular due to the physical characteristics of the film. It is clear, of high tensile strength, forms a good barrier against moisture and vapor transmission, is mildew resistant, has good conformability to the item being wrapped, may be formulated for high slip, and uniquely possesses an inherent self-adherability, or "cling". It is this latter feature coupled with the other desirable characteristics mentioned that has made it most attractive and readily accepted for the wrapping of food.

To acquire these desirable characteristics, the saran film must be oriented. This is accomplished by extruding it in the form of a tube, supercooling, and then blowing the tube outwardly whereby the molecules making up the copolymer are oriented in a pattern other than merely that of the extrusion flow pattern.

Unfortunately, orientation is adversely affected by heat. Because of such loss of orientation, an instantaneous film shrinking occurs. Thus, heat seals are not smooth and a weak seal results. Furthermore, hot melt coating of oriented saran film with other polymeric or copolymeric material to produce a film of more desirable characteristic is not possible. The oriented saran film loses its orientation upon contact with hot melt. In lamination, the hot press rolls usually used cause the saran to act similarly. And, in vacuum forming, saran loses some of its orientation because of the heat necessary to soften it for the draw and "pinholes".

An object of this invention is to provide a novel saran film.

Another object is to provide a saran film laminate capable of being bubble oriented.

Still another object is to provide a method for making said saran film laminate.

A further object is to provide apparatus for making the saran film laminate.

A still further object is to provide a saran film laminate which retains its desirable orientation characteristics even when heat-worked.

Another object is to provide a saran film, of the above characteristics, capable of being heat sealed.

Another object is to provide a saran film of the above characteristics which acts differently to solvents and chemicals on each of its sides.

Another object is to provide a saran film of the above characteristics capable of being vacuum drawn.

Another object is to provide a saran film capable of being heat laminated to paper, plastic, or metal.

Another object is to provide a saran coated paper useful as bottle cap liner material.

Another object is to provide a saran laminate useful for form, fill and seal packaging.

Another object is to provide a film laminate useful as a cheese curing block overwrap.

Another object is to provide a film laminate useful as a heat sealable shrink overwrap.

Another object is to provide a saran wrapping material which is pre-labeled.

Another object is to provide a method for easily making such pre-labeled saran wrapping material.

Other objects of the invention will in part be obvious and will in part appear hereinafter.

It has now been found that vinylidene chloridevinyl chloride copolymer, or "saran" as it is more commonly called in the trade, may be coated with an ethylene-unsaturated ester type copolymer by coextruding said copolymers as a tube. Similar or completely different polymeric materials may also be extruded as further layers thereon, if desired. In any event, the coextrudate is then immediately immersed in one or more tempering baths to chill and to provide a proper blow temperature for the coextrudate. The tube is subsequently blown into a bubble to orient the molecules of the plastic, especially the vinylidene chloridevinyl chloride copolymer molecules which appear to be the main components enabling bubble orientation. Indeed, in the past, it was believed that the behavior of the ethyleneunsaturated ester type copolymer would probably not permit orientation of the saran, at least to the high degree (up to 16 times) of bilateral orientation that is accomplished by the method of the invention. Now, surprisingly, the manner of coextrusion, coupled with the application of correct temperature whereby chilling and reheating of the unoriented tube to just the right temperature, uniquely enables orientation of the entire laminate. Apparently, this is the only way an oriented, coated, saran film can be obtained, since post-coating on oriented saran distorts and deorients the film.

The laminate may then be rolled onto a wind-up roll, or subsequently processed. Subsequent processing may involve lamination to paper, plastic, or metal with the ethylene-unsaturated ester type copolymer ply acting as the adhesive. It may also involve vacuum drawing of the film. The laminate may also be used in the packaging process known as "form, fill and seal", because it is heat sealable. In fact, it is heat sealable at a much lower temperature (180° F) and the seal is strong. This favorably compares to the very weak seal of saran over a narrower range (260° to 280° F). The resultant film of this invention may also be pre-labeled by a "trap label" process wherein a continuous array of individual labels may be trapped between two layers of basic laminate with ethylene-unsaturated ester type copolymer ply of each being adhered together. The resulting label laminate may then be formed and sealed using either high frequency or usual heat sealing methods, depending on the layer structure.

More particularly, a unique saran can now be made by coextruding vinylidene chloride-vinyl chloride copolymer as one layer with an ethylene-unsaturated ester type copolymer such as ethylene-vinyl acetate, ethylene-vinyl propionate, ethylene-methyl methacrylate, ethylene-ethyl methacrylate, ethylene-ethyl acrylate, ethylene-isobutyl acrylate, as the second layer. Additional layers may also be coextruded along with the above mentioned copolymers to effect a variation in the desired characteristics in the film. The laminate, immediately following extrusion, is chilled at 5° to 25° C and then tempered at 20° to 50° C via a cooling and a heating bath respectively for subsequent blowing of the tube to effect orientation of the plastic molecules. After orientation, the film is wound for subsequent use or immediately laminated to other web stock such as paper, or plastic or metal; vacuum drawn, or used directly in a packaging operation such as form, fill and seal, or as a cheese block curing overwrap or other packaging processes.

The invention accordingly comprises an article of manufacture possessing the features, properties, and the relation of elements which will be exemplified in the article hereinafter described, and the several steps and the relation of one or more of such steps with respect to each of the others thereof which will be exemplified in the method hereinafter disclosed, and the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

FIG. 1 is a perspective view of a preferred embodiment of apparatus for preparing the basic laminate of this invention.

FIG. 2 is a side cross-sectional view of the extrusion die head of the apparatus shown in FIG. 1, taken along line 2—2. FIG. 3 is a side cross-sectional view of another embodiment of an extrusion die head that may be utilized.

FIGS. 4 and 4a perspective are views of laminating apparatus showing the basic laminate of the invention being laminated to paper, and either wound on a wind-up roll or else punched into bottle cap liners.

FIGS. 5 and 5a are perspective views of laminating apparatus wherein the basic laminate is labeled via a label trapping technique (FIG. 5) and then formed into a package (FIG. 5a).

FIG. 6 shows a variation of the pre-labeled material of FIG. 5 wherein the labels are discontinuous.

FIG. 7 is a perspective view showing the basic laminate used as a cheese curing block overwrap.

FIG. 8 is a perspective view showing the paper laminated version of the basic saran laminate used for form, fill and seal packaging.

FIG. 9 is a perspective view showing the basic laminate vacuum formed to produce a continuous array of shallow troughs.

Similar reference characters refer to similar parts throughout the several views of the drawings.

The various elements shown in the various figures of the drawing will be explained hereinafter, along with recitation of specific Examples which illustrate the method of making the basic laminate, with or without additional plies, its lamination with and the use of the basic laminate, the added ply laminate and the paper laminate.

EXAMPLE I

PRODUCTION OF BASIC LAMINATE

As indicated above, the basic laminate is made of a ply of vinylidene chloride-vinyl chloride copolymer and a ply of ethylene-unsaturated ester type copolymer.

In making this laminate, a slightly modified form of the apparatus of FIGS. 1 to 3 may be utilized, as explained below.

The apparatus in FIG. 1, comprises an extrusion die head 10 having a plurality of annular extrusion slits (12, 14 and 16), in the two embodiments shown in FIGS. 2 and 3. It should be understood that for the basic laminate, only two slits are actually used. The third slit may be blocked, with a gasket at the lips of the slit.

Since saran is adversely affected by prolonged exposure to high temperature, extrusion slit 12 is preferably designed without a slit feed manifold. Instead, a streamlined flow slit feed 18, leading from the saran extruder barrel 20 to the slit 12 is utilized. The other plastic feed means utilize manifolds 22 and 24 which feed slits 14 and 16 respectively. A manifold is used with ethylene-unsaturated ester type copolymers because it is stable to the temperature encountered in the extrusion.

It might be noted from a comparison of the structures shown in FIGS. 2 and 3, that in FIG. 2 the saran is extruded as the internal ply, whereas in FIG. 3, the saran is extruded as the second or middle ply.

It will also be noted that slits 12, 14 and 16 blend into a singular annular exit slit 17 out of which the laminate 30 exudes as a tube or sock 32. The sock enters a cooling bath 34, maintained at 5° to 25° C to supercool the plastic in the laminate. Squeeze rolls 36 flatten the sock 32 into a lay flat form. The tube 32 then exits the cooling bath 34, travels over guide-squeeze rolls 38, and then into a heating bath 40, maintained at 20° to 50° C, or at another temperature sufficient to heat the plastic whereby it may be expanded and properly crystallized or oriented. Both baths may be contained in a double compartmented tank 42.

The tube 32 travels around guide roll 44 immersed in bath 40. It then leaves bath 40 in a heat-softened condition and travels between bubble seal rolls 46. The tube is then expanded into a plastic bubble 48 via superatmospheric pressure injected into the tube 32 in the customary manner well known in the trade.

To aid in regulating the degree of expansion of the tube, a cooling ring 54 with jet orifices 56 therein may be used to blast cool air or gas against the outside of the bubble to aid in setting or hardening the secondary plastic of the tube 32 at the desired degree of expansion. The air or gas is supplied to the cooling ring from inlet 58.

Expansion of the tube causes orientation of the molecules of the plastic.

After blowing, the tube is flattened via a series of converging rollers 58, and pinch rolls 60. The tube is then wound on windup roll 62 or used directly in converting processes.

With respect to the method of this invention, it might be noted that according to the theory of multiple-layer, bubble-oriented extrusion, laminar flow will prevail when two viscous molten polymers are extruded simultaneously from the same die. For example, when a center rod of saran, surrounded by another polymer, is forced through a sheet die, the flow causes the saran to remain at the center of the other polymer in a uniform layer. Unfortunately, the same does not apply when it is forced into and through a crosshead tube die. Here the normally uniform flow is split. So, the polymer must be distributed in tube fashion on the outside of an already tube-formed saran. The apparatus just described and illustrated in FIG. 1 accomplishes such.

With the two die head arrangements in FIGS. 2 and 3, the distribution of the polymer about the saran is excellent. The means for discerning whether distribution was good can be determined by (1) the symmetry of the resultant bubble, (2) the total gauge measurement of the resultant film across the web, and (3) individual layer thickness by microscopy, and (4) relative flow ratios of the extruders.

Table I, which follows, sets forth a series of runs:

TABLE I

TWO LAYER LAMINATE

| Run No. | Film Polymer Type (Bond) | Secondary Extrusion Rate (Thousand) | Secondary Extrusion Rate Elongation | Saran Thickness (Gauge) Clarity[3] | Secondary Film Thickness (Gauge) Transmission | Extrud- Flex | Film Saran | Film Tensile Strength PSI[14]/in Shrink L[11] | C[12] | Film % lbs./in L | C | Film Seals | $O_2$ Gas | Cold (gm)[13] Up | L | −18° Dart Drop Impact 100° C | C | Heat Seals Peel | Electronic Bag Sheer |
|---|---|---|---|---|---|---|---|---|---|---|---|---|---|---|---|---|---|---|---|
| 1 | ET-[4] 33% VA | 13 | 4-7 | 50-100 | 20-70 | G[8] | E[9] | 9.0 | 9.5 | 60 | 45 | E | | 1 | 50 | 100 | | | 3-4 | 5-10 |
| 2 | ET- 28% VA | 13 | 4-6 | 50-100 | 20-70 | G | E | | | | | E | | | 50 | 125 | | | 3-6 | 10 |
| 3 | ET-[5] 10%EA | 13 | 4-6 | 50-100 | 20-50 | G | G | | | | | G | | 1 | 40 | 90 | | | 1 | 3-7 |
| 4 | ET- 20% EA | 13 | 4-6 | 50-100 | 20-50 | G | G | | | | | G | | | | | | | | |
| 13 | ET-[6] IsoBA | 13 | 4-6 | 50-100 | 20-50 | G | E | | | | | F[19] | | | | | | | | |
| 14 | Saran[7] | 13 | 6-10 | 50-100 | 50-100 | G | E | | | | | E | | | | | 34 | 34 | | |
| 15 | ET- 33% VA | 27 | 4-9 | 50-100 | 20-70 | G | E | | | | | E | | 3-7 | | | | | | |
| 16 | ET- 33% VA | 17 | 4-7 | 50-100 | 20-70 | G | E | | | | | E | | | | | | | | |
| 17 | ET- 20%EA | 17 | 4-7 | 50-100 | 20-50 | G | G | 13.1 | 9.0 | | | E | 11 | 3-6 | 47 | | 41 | | | 13-16 |
| 18 | ET- 20%EA | 17 | 4-7 | 50-100 | 20-50 | G | G | | | | | E | | | | | | | | |
| 30 | None[7] | 13 | | | 25-150 | G | G | 12.0 | 12.0 | 60 | 60 | E | 1 | 1 | 100 | 18 | 18 | 1 | 1 | 12-19 |
| 31 | None | 17 | | | 25-150 | G | G | 10.0 | 10.0 | 80 | 80 | E | 18 | 3 | 150 | 35 | 35 | 1 | 2 | |

[1]Extrusion
Good - could make continuous roll of film.
Fair - could make bubble sections only.
[2]Bond
Excellent - could not separate films with tape.
Good - could separate films with tape.
Fair - could separate films by scraping cross-sectional area with razor blade.
[3]Film Clarity
Excellent - clear.
Good - slight haze.
Fair - medium haze distorts objects 5 feet away.
[4]Ethylene-vinyl acetate.
[5]Ethylene-ethyl acrylate.
[6]Ethylene-isobutyl acrylate.
[7]Control
[8]Good
[9]Excellent
[10]Fair
[11]Lengthwise
[12]Crosswise
[13]Grams
[14]Pounds per square inch.

Referring to Table I, the results are best discussed in terms of those posted in the table.

In runs 1 to 4, 13, 14 and 30, saran was of the commercial type, that is the household film polymer sold as Saran Wrap by Dow Chemical Company, Midland, Michigan.

Runs 15 to 18 and 31 utilized the shrink bag type saran usually used in turkey bag and chicken bag applications.

In runs 1 and 2, the ethylene-vinyl acetate copolymer was extruded as the outer layer. The latter is a much softer and tackier plastic than regular saran. The bond between the two plys is excellent and the films are heat-sealable.

In winding up the laminated film, a slip sheet could be used to prevent the copolymer from blocking. Blocking agents could also be used to make said copolymer less tacky. Conversely, the tackiness of the unsaturated ester copolymer makes it an excellent adhesive layer for other films, paper, or metal and this is described below.

In runs 3 and 4, the ethylene-ethyl acrylate extruded with the greatest ease in conjunction with saran. However, this combination does not have as much bond between the two films as is desirable. An ethylene-vinyl acetate layer between the two would, because of its tackiness, provide the necessary glue layer to effect an excellent three-ply laminate, and such a laminate is described below (see Example II).

Run 13 illustrates the use of ethylene-isobutyl acrylate as the copolymer. It produces an excellent film bond with good extrudability.

The $O_2$ gas transmission values of Table I reveal that the gas transmission, in general, follows the type of saran used.

The percent shrink also seems to follow that of the saran used. Thus, if a shrink type saran is used, the shrink characteristics of the resultant laminate are similar.

High frequency heat sealing of bags where the ethylene-unsaturated ester copolymer is on the outside was successful. This is a most unique and highly desirable result, and was unexpected since ethylene-unsaturated ester copolymers cannot normally be high frequency sealed.

The cold flex is also improved over saran. In addition, the films produced are clear. A good bond is effected between the layers and since saran constitutes one layer, a good barrier film is therefore produced. The films of these Examples also have considerable strength and retain their shrink characteristics.

EXAMPLE II

THREE LAYER LAMINATE

In this Example, the innermost layer (of the tube or bubble) is saran, a matrix which gives desirable bubble forming characteristics and furnishes excellent barrier properties in the finished film. The middle layer is ethylene-vinyl acetate for a glue layer, and cold temperature properties in the finished film. The outer layer of the tube or bubble is composed of ethylene-ethyl acrylate. This layer provides anti-blocking, low temperature properties and heat sealability to the finished film.

The die that is used in making this three-layered film is shown in FIG. 2. In this instance, all extrusion slits are used. The saran is fed by a first extruder (not shown) into slit 12. At a lower point, the saran is covered by ethylene-vinyl acetate fed from manifold 24 into slit 16 by a second extruder. The combination of saran and ethylene-vinyl acetate flow downward and in turn are covered by ethylene-ethyl acrylate fed from manifold 22 into slit 14 by a third extruder. The combined extrudate exits from the 1⅜ diameter exit slit 17 as a molten tube.

Thereafter, the procedure follows essentially the same procedure with similar equipment as that used in making the basic laminate of Example I. The main differences are:

1. An additional extruder because of the the third ply.
2. Higher bath temperatures in the hot bath for blowing the exterior polyolefin.
3. Air cooling ring around blown bubble to remove excess heat after orientation.

Films of 50 to 300 gauge may be produced by the method of this Example. The thickness ratio of the saran to the total thickness of the secondary and tertiary films usually runs about 2:1. The ratio of the secondary and tertiary layers to each other is usually about 1:1.

Tubing widths from 12 to 17 inches, and greater, are possible.

In regard to gauges and widths, either one may be altered by the expansion of the oil sock and/or the speed of the train and of course a larger die could be utilized.

Extrusion rates are generally in the range of 40 to 50 lbs/hr., total, for all three extruders. The rates of the extruders feeding the secondary and tertiary layers are usually 6 to 8 lbs/hr. each.

In co-extruding the three-layered film, saran appears to be the primary layer. This layer is cooled by the sock fluid and remains amorphous until blown. It forms the matrix of the bubble which resembles that found when making regular saran film. This layer provides tensile and barrier properties and high shrink if shrink-type saran is used.

The secondary layer (center glue layer) of ethylene-vinyl acetate is soft and tacky; it flows readily and is less affected by temperature changes in the baths. Evidently this layer glues the other layers together.

The tertiary layer, or the layer exposed to the baths, is ethylene-ethyl acrylate. This plastic must be reheated in the hot bath before it will allow the bubble to be blown. It is necessary to then remove this heat by air cooling the bubble and establish an expanded end-point. This layer aids in sealability and low temperature properties.

EXAMPLE III

THREE LAYER LAMINATE

In similar fashion as Example II, the die of FIG. 3 is also useful. It is designed to put the saran layer in the center position of the three-layer laminate. The inner layer is ethylene-ethyl acrylate and the outer layer is ethylene-vinyl acetate. The only variation over the procedure of Example II is in the cooling and reheating of the layers for tube expansion.

EXAMPLE IV

THREE LAYER LAMINATE

A reversal of outer and inner layers with the ethylene-vinyl acetate extruded to form the inside layer is also effective, but it blocks so badly that unless blocking agents are blown into the sock through die head 10 or slip sheets are used, or saturated amides are blended into the ethylene-vinyl acetate, the tube cannot be opened for subsequent blowing.

It might be noted that the blown bubble has a tendency to curl away from the saran when the tube is opened. This makes it difficult to work with. A thinner layer of ethylene-vinyl acetate obviates some of this problem. A post-treatment consisting of passing the reblown bubble through a heat tunnel or over hot rollers also improves this curl problem greatly.

Representative films are made, then subjected to physical tests. The results shown in Table II are typical data from such tests.

laminated to paper 102 as a strip (about 5 to 12 inches wide), which avoids the need to manufacture wide webs, by passage between heated (about 200° F) roll 104 and press roll (about 25 psi) 106. If desired, the paper used can be preprinted. The heat marries the ethylene-vinyl acetate to the paper. Dielectric heat sealing of the pressed laminate paper may also be utilized to marry the two together.

The resultant coated paper 108 may be wound onto windup roll 110 for subsequent use, or it may be utilized

TABLE II

PHYSICAL PROPERTIES OF THREE LAYER LAMINATE

| FILM | GAUGE | TENSILE STRENGTH PSI (in Thousands) L$^{(1)}$ | C$^{(2)}$ | % ELONGATION L | C | DART DROP −18° C 66 cm | COLD FLEX −18° C. | O$_z$ TRANS cc/100 sq.in./mil | % SHRINK 100° C 1 MIN L | C |
|---|---|---|---|---|---|---|---|---|---|---|
| Saran (control) | 200 | 8,000 | 10,900 | 120 | 135 | 600 gm | 1 | 16 | 41 | 41 |
| Saran (control) | 150 | 12,000 | 12,000 | 60 | 60 | 300 gm | 1 | 1.0 | | |
| 2-Layer Saran (control) | 200 | 11,200 | 12,600 | 117 | 138 | 300 gm | 1 | | | |
| 3-Layer Saran Et-VA(3) Et-EM(4) | 205 | 8,200 | 7,900 | 148 | 138 | Et-EA up = 1150 gm Saran up = 600 gm | 6 | 13 | 40 | 41 |
| 3-Layer Saran Et-VA Et-EA | 200 | 8,900 | 8,600 | 230 | 170 | Et-VA up = 3000 gm Saran up = 1600 gm | 6 | | | |
| 3-Layer Saran Et-VA Et-EA | 200 | 11,000 | 10,000 | 107 | 112 | Et-VA up = 1100 gm Saran up = 700 gm | +1 | 1.7 | | |

$^{(1)}$Lengthwise
$^{(2)}$Crosswise
$^{(3)}$Ethylene-vinyl acetate copolymer
$^{(4)}$Ethylene-ethyl acrylate copolymer From Table II, it is evident that three-layer films made via Examples II to IV have:
1. Such excellent layer bonding that they cannot be separated.
2. Cold temperature properties that are not attainable in regular saran films.
3. A broader and lower range of heat seal temperatures over those obtainable with regular saran with improved seal strengths.
4. Tensile, elongation, barrier and shrink properties essentially identical to regular saran.

Table III which follows shows some of the uses of such three-layer film and the advantages therefrom.

TABLE III

USES OF THREE-PLY LAMINATE

| APPLICATION | ADVANTAGES | PRIOR PRODUCT |
|---|---|---|
| Air Duct Covering | Better toughness, self-extinguishing tear, snag and puncture resistant | 200 gauge saran |
| Cheese Curing Block | Manufacture by layered extrusion rather than hot combining | (1) saran films (2) wax/cellophane/foil/ polyethylene laminate (3) saran/polyethylene "cling" product |
| Bags | Tougher outer layer - better abrasion resistance and low temperature toughness | Saran |
| Candy Bags | Good barrier - good sealability- eliminate combining operation and dusting | Saran |

The Examples which follow illustrate further such processing and uses of the basic laminate and/or the three-layer laminates of Examples II to IV.

EXAMPLE V

LAMINATION TO PAPER AND BOTTLE CAP LINER

The basic laminate 100 (FIG. 4) of vinylidene chloride-vinyl chloride with ethylene-vinyl acetate of Example I with the latter polymer as the adhesive is laminated to paper 102 using the apparatus of FIG. 4. It is on a bottle cap liner making machine. The latter utilizes a punch 112 and a die 114 to stamp out bottle cap liners 116 from the coated paper 108. With the saran layer up, an excellent bottle cap liner is produced.

Saran and other plastic film coated with a pressure sensitive adhesive have been used as protective coverings for polished surfaces such as chrome-plated steel. Unfortunately, the sensitivity of the organic film to direct sunlight causes the film to degrade, and has prevented wide scale adaptation of such use.

EXAMPLE VI

LAMINATION TO METAL AND USE AS PROTECTIVE COVERING

The basic laminate of Example I is married to aluminum or other metal foil such as tin-plated steel with the saran side outward. This metal laminate, with the metal side outward, is then used to coat chrome-plated steel sheets. To do so, the metal is slightly warming and then the laminate is rolled onto the surface of the chrome-plated steel sheet using a suitable pair of rubber/steel rolls. Thereafter, such coated chrome-plated steel is used for exterior construction while the laminate is adhered thereto. In this way, the chrome-plated steel sheet is protected. After installation, the laminate is peeled off.

In tests to compare the resistance to sunlight, samples of saran coated chrome-plated metal are exposed for thirty days in Florida sunlight. The saran film on the chrome-plated metal decomposed and either became difficult to remove or corroded the metal. When a metal laminate such as described above is used as above, no decomposition will be noted, probably because the film is protected or shaded by the metal foil which is laminated thereto as the outer covering.

EXAMPLE VII

TRAPPED LABEL LAMINATE-CHUB USE

Referring to FIGS. 5 and 6, two sheets 120 and 122 of the basic laminate of Example I (with the ethylene-vinyl acetate comprising about 8 to 36% vinyl acetate in said copolymer of a melt index of 2 to 30) having their ethylene-vinyl acetate sides facing each other, are passed between two press rolls 124 and 126 which may be heated or used in conjunction with dielectric heating means. Prior to such passage, a continuous length of printed polyethylene 128 (or other films, paper, textile or foil) is put between the two sheets. A discontinuous array 131 of labels may also be used. It will be found that trapping of the foreign film, paper or foil is perfectly made. There is no slipping of the label during use as frequently occurred where mono-layer saran was used with a label trapped therebetween.

Operative limits are as follows: Roll pressure — as found in usual rubber-metal nip rolls. Temperature — approximately room temperature to 175° F. Rate — ordinary film combination rates of 1 to 200 f.p.m.

Label variants are as follows:

Ethylene-unsaturated ester type copolymer, vinyl chloride, polyester, polyethylene, polypropylene, cellophane, paper, textiles, foil and other web material.

Of the ethylene-unsaturated ester type copolymer, ethylene-vinyl acetate will be found to be the easiest processing tack polymer which can be used for trapped label work. To permit unwinding from the supply roll, a saturated amide (i.e. stearamide), in percentages of 0.05 to 1.0%, dependent on the thickness of the olefin layer and the slip and anti-block characteristics of the saran, is best, because it has the least adverse effect on clarity. Other finely divided inorganic powders such as calcium carbonate, or tetra sodium pyro phosphate are also effective to a much smaller degree, unless combined with a saturated amide. Layer thicknesses of greater than 0.00003 (3 gauge) inches should be used to effect necessary laminating characteristics.

With respect to the saran, a high slip additive content saran formulation is used. The trapped label laminate may then be used directly in a chub making machine, such as that made by Kartridge-Pak, 807 Kimberly, Davenport, Iowa.

The principal element of the usual chub machine comprises guide rolls 129 and 130, a hollow tube former 132 with a stuffer 134 extending therethrough. The former 132 forms the tube, which is longitudinally sealed by a high frequency or hot air sealer 136. The tube is then stuffed with product and then clipped into chub length.

EXAMPLE VIII

CHEESE CURING BLOCK OVERWRAP

The laminate of Examples I and V are used to wrap cheese blocks. A three-layer film utilizing a saran core and an ethylene-vinyl acetate coating on both surfaces could also be utilized for this application provided blocking agents are used in the outer ethylene-vinyl acetate coating. The overlapped ends are folded in the manner shown in FIG. 7. The blocks wrapped with the laminate of Example I have the ethylene-vinyl acetate layer on the outside. The blocks wrapped with the laminate of Example V have the paper layer on the outside. The paper layer increases the strength of the inner saran layer and permits the removal of both paper and the saran laminate at one time and in one piece, thus saving time and labor. Previously, two wrappers, one of film and one of paper, were used.

The blocks wrapped in the laminate of Example I, when inspected after a one-month storage period, will exhibit no mold. Inspection of the blocks wrapped with the laminate of Example V cannot be made because of the paper overwrap which is sealed to the film, unless the wrapper is destroyed. However, when completely unwrapped, similar results will be evident.

Table IV which follows shows some results of use of the laminate of Example I as cheese curing block overwrap:

TABLE IV
CHEESE CURING BLOCK OVERWRAP

| Run No. | Gauge | Saran | Ethylene Unsat. Ester | Lengthwise Tensile Strength | Lengthwise % Elongation | Lengthwise 2% Secant Modulus | Crosswise Tensile Strength | Crosswise % Elongation | Crosswise 2% Secant Modulus | Dart Impact 25° C −18° C | Boiling Water % Shrink 100° C L | Meat Seal O₂ Trans | Gradner Test Clarity | Gradner Test Hazel | Gradner Test Gloss | Temp °F | Peel Strength (16 sq/in) |
|---|---|---|---|---|---|---|---|---|---|---|---|---|---|---|---|---|---|
| 1 | 75(1) | commercial household | ethylene-28% VA + 0.5% stearamide +.07% particles | 11,300 psi | 41% | 74,600 | 13,200 psi | 46% | 71,400 psi | | 26% 14% | | 90 | 1.3 | 100+ both sides | 145 185 225 265 305 | .34 2.05 2.19 2.72 3.50 |
| 2 | 75(1) | commercial cheese wrap | same | 12,000 psi | 55% | 55,500 | 13,000 psi | 51% | 50,000 psi | 5.17 g/cm/mil | 28% 24% | | 97 | 1.5 | 100+ both sides | 145 185 225 265 305 | .83 1.34 1.58 1.31 1.35 1.55 |
| 3 | 75(1) | commercial cheese wrap | ethylene-28% VA + 1.0% stearamide +0.7% particulate material | 10,000 psi | 44% | 63,500 | 14,400 psi | 57 | 50,000 psi | 5.78 | 25% 23% sq. in. | .87 cc/100 | 99 | 1.5 sides | 100+ both 275 | 355 145 215 .74 355 | 2.47 .41 .78 .90 |
| 4 | 79 | same | — | 8,400 | 58% | 69,200 | 10,300 | 35 | 57,700 | 6.05 | 20% 15% cc/100 | 1.31 sq. in. | 86 | 1.7 both | 100+ 245 sides | 215 .17 295 | .03 .32 |

(1) 60 saran, 15 EVA

From the above tests and others, it will be found that ethylene-vinyl acetate (28%) copolymer is the most effective for the heat seal packaging of cheese. While other vinyl acetate levels may be effective, they must be especially formulated to permit unwinding from mill rolls and yet maintain the correct cling level. Again, stearamide, (0.05% to 3% by weight, dependent on the thickness of the olefin layer and the slip and anti-block characteristics of the saran layer) can be used as an anti-blocking agent. The other finely divided inorganic powders, (calcium carbonate, tetrasodium pyrophosphate) may also be used.

If the layer thickness of the ethylene-vinyl acetate is increased up to 0.00040 inches, the effectiveness of the heat seal will also increase. A heat sealing temperature range of about 165° F to 355° F with 0.00010 inches ethylene-vinyl acetate/0.00070 inches saran is effective, whereas regular saran seals are about four times weaker and heat seal range is only about 260° F to 280° F.

This new material makes it possible for the first time in the history of saran for a saran type film to compete in a market which before was almost entirely dominated by wax/cello/foil laminates. It can be heat sealed in any of the conventional manners including the use of electric hot plates, electric or hot water presses, and by placing the wrapped blocks in the cheese hoops and spraying them with hot water or steam.

EXAMPLE IX

FORM, FILL AND SEAL

As illustrated in FIG. 8, the saran laminate of Example I is used on form, fill and seal equipment for packaging powdered and granulated products. Such equipment utilizes as its basic components two forming rolls 140 and 142 with depression 143 therein to form the package 144. The rolls are heated to seal the laminates (the ethylene-vinyl acetate layer of each facing outwardly) as the product 146 is sealed therein. The equipment utilized can be:

Triangle Package Machinery Company
6655 W. Diversey Ave.
Chicago, Illinois 60635

Hayssen Manufacturing Co.
P. O. Box 571
Sheboygan, Wisconsin 53081

Bartelt Engineering Co., Inc.
Subs. of Riegal Paper Corp.
1900 Harrison Ave.
Rockford, Illinois 61101

FMC Corporation
Canning Machinery Div.
333 West Julian St.
San Jose, California 95108

Hesser Fr. Machinenfabrik Aktiengesellschaft
Neuheimer Strasse 99
Stuttgart-Bad Cannstadt
Germany Mira-Pak, Inc.
7000 Ardmore
Houston, Texas 77021

Package Machinery Company
330 Chestnut St.
East Longmeadow, Mass. 01028

Wright Machinery Co.
Div. of Sperry Rand Corp.
Calvin and Holloway Sts.
Durham, N.C. 27201

Standard Packaging Corporation
Flexible Packaging Division
1 Lisbon St.
Clifton, N.J. 07015

These utilize heat and impulse sealers of the usual type and it might be noted that in the past, saran could only be high frequency, electronically sealed, using these machines. Thus, the laminate of this invention now enables heat sealability never heretofore possible.

Heretofore, pouches for maximum barrier use comprised polyethylene coated or laminated to aluminum foil. The polyethylene surfaces were heat sealed together at the edges to make the pouch.

EXAMPLE X

POUCHES

Aluminum foil and the basic laminate of Example I with the saran facing outward are laminated together following the method of Example V. Then, two such aluminum foil (ethylene-vinyl acetate) saran laminates are formed into pouches using equipment such as shown in FIG. 8. The pouch formed therefrom will furnish a maximum barrier foil pouch since the seal area is saran. Furthermore, any pinholes in the aluminum will be covered essentially by saran which is a high barrier film.

The aluminum foil used can be of the rigid or flexible variety depending on the package demands. Since saran can be extruded quite thinly, (in the range of 25 gauge), and since the ethylene-vinyl acetate layer can be as thin as 10 gauge or less, if desired, (at least enough to provide a bond), a relatively thin aluminum laminate can be produced even though aluminum pinholes increase inversely as the thickness. The better "pinhole plugging" capacity of the high barrier saran enables use of aluminum foil as low as 23 gauge.

The advent of thin tin-coated steel sheet also makes such foil possibility. Combinations of the tin-coated sheet of 50 gauge thickness made with ethylene-vinyl acetate and saran are as effective as other aluminum foil.

Use tests reveal that a superior pouch material, better than now on the market, has been produced. Shelf life is increased and flavors are better preserved in the package. Resistance to oils and chemicals is also greater.

EXAMPLE XI

VACUUM DRAW

The low cost basic laminate of Example I is used in a vacuum draw process to form webs such as illustrated in FIG. 9, on customary draw machines such as:
Mahaffy 614
Mahaffy and Harder Engineering Co.
Newark, N.J.

Standard Packaging 612
Standard Packaging Corporation
Flexible Packaging Div.
1 Lisbon St.

Clifton, N.J. 07015 and others. Similarly, pressure forming, or vacuum draw with a plug assist would also be used since these are mere variants on a vacuum form technique.

The laminate gauge thickness may be 0.5 to 4.0 mils.

In such operation, it will be found that the basic laminate of Example I has good drawability to 2 inches. It has excellent optical properties before and after forming. And the resultant formed item is readily heat sealed especially if the ethylene-vinyl acetate was selected to seal at temperatures of about 200° F.

Compared to the known art which teaches use of a laminate of mylar or nylon with a saran coating, the mylar is limited in draw depth to 1 inch, and the nylon is very expensive and not optically attractive.

EXAMPLE XII

PAPERBOARD AND PACKAGING

The laminate of Example I (at least 50 gauge saran with 5 gauge ethylene-vinyl acetate) is laminated to paperboard with heat and pressure — the ethylene-vinyl acetate side to the paperboard.

The resultant saran coated paperboard is then formed into containers, such as milk cartons or cereal boxes. The saran provides a barrier for greases and gases and moisture. Such containers can be hermetically sealed by dielectric sealing provided a saran to saran contact can be made.

Alternatively, the laminate of Example I could be thermoformed and then laminated to paperboard, as in the blisterpack, skin pack, pre-fab flexible blisterpack, or stretch film pack techniques. This film can be printed on either side prior to lamination. In effect, the printing could be trapped or on the surface, and the lamination could be on one or two sides of the paperboard.

Since a saran of shrinkability may be used, it should also be evident, as seen, for example, in Example XII above, that many of the above articles may be subjected to a post-treatment whereby the laminate of Example I or its derivatives, as described above, are shrunk.

It will thus be seen that the objects set forth above, among those made apparent from the preceding description, are efficiently attained and, since certain changes may be made in the above article and method and construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described:

What is claimed is:

1. A pouch comprising two sheets of a bilaterally oriented plastic laminate comprised of a first layer of a vinylidene chloride-vinyl chloride copolymer containing a predominant amount of vinylidene chloride in the copolymer molecule, and a second layer of an ethylene-unsaturated ester type copolymer containing a predominant amount of ethylene in the copolymer molecule and wherein said unsaturated ester is selected from the group consisting of vinyl acetate and isobutyl acrylate, said first layer and said second layer being non-separable with tape and said laminate being prepared by coextruding said first layer and said second layer as a plural layered tube, chilling said tube at a temperature of about 5° C to about 25° C and then tempering said tube at a temperature of about 20° C to about 50° C immediately prior to blowing said tube into a bubble with a fluid whereby the molecules of said copolymer are bilaterally oriented and wherein the total area of said bubble is at least about 16 times the area of said tube, said layer of vinylidene chloride-vinyl chloride of one laminate being joined to said layer of vinylidene chloride-vinyl chloride of the other laminate to form said pouch.

2. A plastic trough having wall and base portions formed of a bilaterally oriented plastic laminate comprised of a first layer of a vinylidene chloridevinyl chloride copolymer containing a predominant amount of vinylidene chloride in the copolymer molecule, and a second layer of an ethylene-unsaturated ester type copolymer containing a predominant amount of ethylene in the copolymer molecule and wherein said unsaturated ester is selected from the group consisting of vinyl acetate and isobutyl acrylate, said first layer and said second layer being non-separable with tape and said laminate being prepared by coextruding said first layer and said second layer as a plural layered tube, chilling said tube at a temperature of about 5° C to about 25° C and then tempering said tube at a temperature of about 20° C to about 50° C immediately prior to blowing said tube into a bubble with a fluid whereby the molecules of said copolymer are bilaterally oriented and wherein the total area of said bubble is at least about 16 times the area of said tube, said second layer forming the lining of said trough.

3. A wrapped cheese curing block comprising a block of cheese wrapped in a bilaterally oriented plastic laminate comprised of a first layer of a vinylidene chloridevinyl chloride copolymer containing a predominant amount of vinylidene chloride in the copolymer molecule, and a second layer of an ethylene-unsaturated ester type copolymer containing a predominant amount of ethylene in the copolymer molecule and wherein said unsaturated ester is selected from the group consisting of vinyl acetate and isobutyl acrylate, said first layer and said second layer being nonseparable with tape and said laminate being prepared by coextruding said first layer and said second layer as a plural layered tube, chilling said tube at a temperature of about 5° C to about 25° C and then tempering said tube at a temperature of about 20° C to about 50° C immediately prior to blowing said tube into a bubble with a fluid whereby the molecules of said copolymer are bilaterally oriented and wherein the total area of said bubble is at least about 16 times the area of said tube.

4. In a laminated structure: a bilaterally oriented plastic laminate comprised of a first layer of a vinylidene chloride-vinyl chloride copolymer containing a predominant amount of vinylidene chloride in the copolymer molecule, and a second layer of an ethyleneunsaturated ester type copolymer containing a predominant amount of ethylene in the copolymer molecule and wherein said unsaturated ester is selected from the group consisting of vinyl acetate and isobutyl acrylate, said first layer and said second layer being non-separable with tape and said laminate being prepared by coextruding said first layer and said second layer as a plural layered tube, chilling said tube at a temperature of about 5° C to about 25° C and then tempering said tube at a temperature of about 20° C to about 50° C immediately prior to blowing said tube into a bubble with a fluid whereby the molecules of said copolymer are bilaterally oriented and wherein the total area of said bubble is at least about 16 times the area of said tube; and a layer of material selected from the group consisting of paper, paperboard, metal and metal foil adherent to said plastic laminate.

5. Bottle cap liners comprising appropriately shaped portions of the laminate of claim 4, wherein said layer is paper and said layer of ethylene-unsaturated ester type copolymers is between the paper and the layer of vinylidene chloride-vinyl chloride copolymers, and the latter faces the interior of the bottle when in use.

6. A wrapped cheese curing block comprising a block of cheese wrapped in the laminate of claim 4 wherein said layer is paper and is on the outside.

7. A protected ornamental flat surface comprising the surface of an object having adhered thereto the laminate of claim 4 wherein said layer is metal foil and is on the outside.

8. A trapped label laminate comprising two sheets of a bilaterally oriented plastic laminate and a printed label therebetween, each of said sheets being comprised of a first layer of a vinylidene chloride-vinyl chloride copolymer containing a predominant amount of vinylidene chloride in the copolymer molecule, and a second layer of an ethyleneunsaturated ester type copolymer containing a predominant amount of ethylene in the copolymer molecule and wherein said unsaturated ester is selected from the group consisting of vinyl acetate and isobutyl acrylate, said first layer and said second layer being non-separable with tape and said laminate being prepared by coextruding said first layer and said second layer as a plural layered tube, chilling said tube at a temperature of about 5° C to about 25° C and then tempering said tube at a temperature of about 20° C to about 50° C immediately prior to blowing said tube into a bubble with a fluid whereby the molecules of said copolymer are bilaterally oriented and wherein the total area of said bubble is at least about 16 times the area of said tube, said first layers of said sheets being on the outside of said label laminate.

9. A package comprising the label laminate of claim 8 sealed longitudinally and clipped at both ends.

* * * * *